Figure 1:
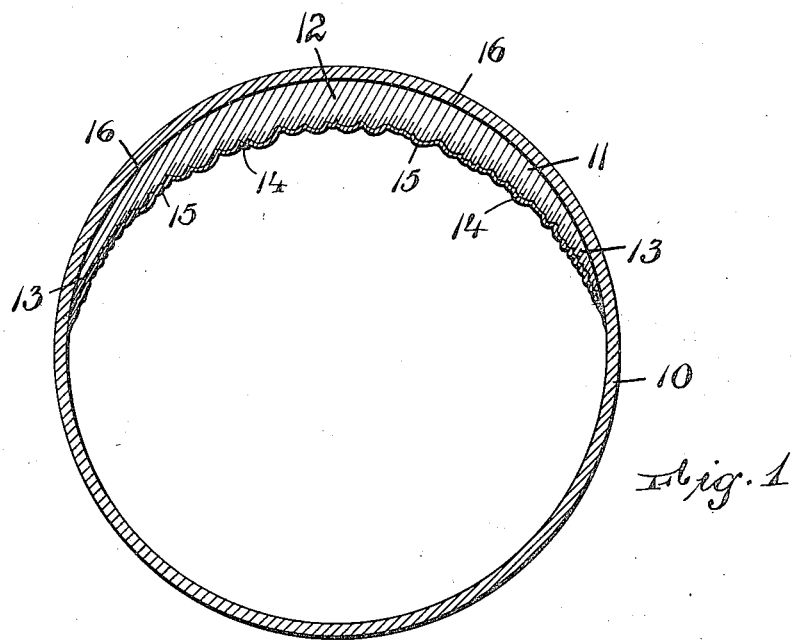

G. J. REUTER.
SELF HEALING TUBE AND PROCESS OF MAKING SAME.
APPLICATION FILED JAN. 11, 1917.

1,237,698.

Patented Aug. 21, 1917.

INVENTOR
George J. Reuter
BY
Dyke & Canfield
ATTORNEYS

UNITED STATES PATENT OFFICE.

GEORGE JOSEPH REUTER, OF NEWARK, NEW JERSEY.

SELF-HEALING TUBE AND PROCESS OF MAKING SAME.

1,237,698.   Specification of Letters Patent.   Patented Aug. 21, 1917.

Application filed January 11, 1917. Serial No. 141,799.

*To all whom it may concern:*

Be it known that I, GEORGE JOSEPH REUTER, a citizen of the United States, and a resident of Newark, county of Essex, and State of New Jersey, have invented certain new and useful Improvements in Self-Healing Tubes and Processes of Making Same, of which the following is a specification.

My invention relates to self healing tubes for pneumatic automobile tires and to the process of constructing such tubes.

According to my invention tubes are produced which automatically heal themselves after puncture and which retain the quality of self healing over extended periods, the material provided for self healing having no deteriorating effect on the rubber of the tube. This self healing material, which is preferably raw, unvulcanizable rubber gum, is preferably put on the tube when the same is on the forming mandrel before being turned inside out, and being reversed from the outer to the inner side of the tube is thereby compressed into a smaller dimension and the healing qualities are increased by reason of such compression.

The process of making such tube may be carried out in several ways, and I will describe two modifications of the process.

A completed tube of ordinary construction, such as is in common use, may be made self healing in accordance with my invention, and preferably I make use of such tube before its ends are spliced together, or if they have been spliced, the splice may be opened or the tube may be cut across. Such tube may be stretched on the usual hollow mandrel, being turned inside out as it is stretched thereon. Then the exposed portion of the tube may be roughened as by buffing about half way around its exposed surface from end to end, and upon this roughened surface I apply raw rubber gum cement, and when it is dry I am ready to apply the healing material which, as already stated, is preferably raw, unvulcanizable rubber gum. Such material is preferably provided in the form of a strip preferably chamfered off or thinned at each edge and having a length substantially the same as the inner tube and a width substantially equal to half the circumference of the tube, though, of course, it may be narrower or wider according as the surface to be made self healing is to be greater or less in width. The rubber gum having dried on the roughened surface of the tube, vulcanizing acid is preferably applied, and the sticky, adhesive strip of self healing gum is laid thereon and pressed firmly in place, so that it becomes acid cured to the tube. I may then acid cure the exposed surface of the self healing gum material, thereby forming a thin film of vulcanized rubber over its exposed surface. This completes the self healing tube except for splicing, and it may now be stripped off the mandrel and spliced together, the self healing gum being removed for a couple of inches on that end of the tube which comes outside when making the splice, and the splice being preferably made in the usual way by acid cure with the ends of the healing layer of material substantially abutting against one another. The acid cured film on the interior of the tube so formed substantially serves to imprison the unvulcanized gum between itself and the inner surface of the tube proper so that the same can not oxidize, as the access of air thereto is prevented, and furthermore, if the tube should become pinched or the tire runs flat, as may be caused, for example, by a leaky valve, there will be no tendency of the parts on the interior of the tube to adhere together.

Another mode which I may follow in manufacturing the entire self healing tube, not having a completed tube to begin with, may be substantially as follows: Vulcanizing rubber may be provided of the ordinary thickness for forming an inner tube of the common sort now in use, and may be placed upon the mandrel with the healing strip of raw unvulcanizable gum chamfered on its edges applied as before to cover the vulcanizable material of the tube for substantially half its width or thereabout, and over this I may apply a thin layer of vulcanizing gum which may be preferably extended at its edges slightly beyond the unvulcanizable healing raw gum composition, and the entire tube so formed may be placed in a vulcanizing oven and vulcanized preferably by a long slow vulcanization at comparatively low vulcanizing temperature, care being exercised to keep the interior of the mandrel well heated during the vulcanizing so that the tube may have the proper temperature throughout all of its mass. This completes the forming of the tube except for splicing, which, upon the tube being turned wrong side out, as it is drawn off the mandrel, is accomplished in the same manner as already described when operating upon a previously vulcanized tube.

Figure 2:
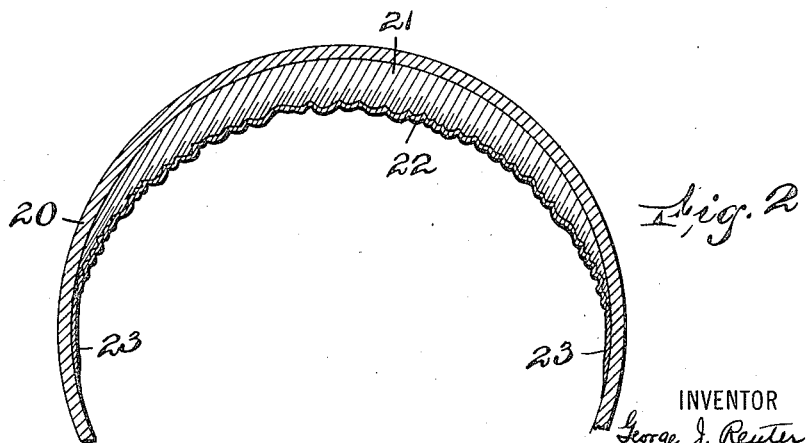

In the drawing I have shown, for the purpose of making my invention clearly understood, two forms of tube embodying my invention, Figure 1 being a cross-sectional view of a tube formed in accordance with the first described modification of my process, and Fig. 2 being a cross-sectional view of a tube formed in accordance with the second modification thereof above described.

In Fig. 1 the material of the tube proper, that is to say, the part corresponding to the ordinary inner tube in common use, is designated by the reference character 10. 11 is applied to designate the strip of healing material which is preferably of greatest thickness at about its center 12 which comes opposite the tread portion of the casing in use, and is tapered off or chamfered at its sides, as indicated at 13. This material being applied on the portion of the tube which is outside before the tube is turned inside out, and thereby being substantially compressed when it is brought to the inside of the tube, tends to form convolutions 14, 14, and 15 designates the inner skin of vulcanized rubber which may be formed as already described by means of an acid cure. Reference character 16 is applied to designate the gum and acid cure material whereby the strip 11 is preferably cured to the tube portion 10, though it will be understood, of course, that as these parts are firmly united together substantially all demarcation therebetween is practically eliminated in the completed article.

In Fig. 2 the reference character 20 indicates the wall corresponding to the ordinary inner tube, 21 the healing gum, and 22 the inner wall which preferably extends slightly past the edges of the healing strip 21, as indicated at 23. As these parts are preferably secured together before vulcanizing, the parts 20 and 22 being vulcanized during such process by reason of their containing suitable vulcanizing materials, there is no line between them corresponding to the line 16 in Fig. 1, but the vulcanizing materials permeate to at least a slight degree into the gum 21 on both sides, so that all the parts are very firmly and completely vulcanized together, and the complete tube is formed with the healing material 21 completely inclosed between the vulcanized layers 20 and 22. The inner vulcanized layer 22, in addition to protecting and inclosing the healing material, serves to distribute the pressure of the air in such manner as to assist materially in the healing action, and, if desired, such layer may be made much thicker relative to the other parts than as shown, though ordinarily this is not necessary. Tubes constructed in accordance with my invention do not comprise any fabric, and in my claims the term "all rubber" is used to define a tube in which no fabric or similar material is used, the only materials being rubber or rubber composition and materials having similar properties to rubber and rubber compositions.

I have subjected tubes constructed in accordance with my invention to very severe tests, repeatedly driving nails through them and pulling them out. With all of such tests the opening heals immediately upon the withdrawal of the puncturing object, and I have had these tubes on test for several months and in no case has there been any need to supply any additional air because of loss thereof by puncture. Tubes constructed in accordance with my invention have all the advantages of the ordinary inner tube for pneumatic tires, they are much stronger than such ordinary tubes, and they do not interfere in any way with the resilient qualities of the tire and at the same time they do away with practically all of the objectionable features of the ordinary inner tube now in common use in pneumatic tires.

It is to be understood that the disclosures hereof are for the purpose of affording a clear understanding of my invention only and that I am not to be limited to the specific showing, but that changes therein and modifications thereof may be resorted to within the scope of my claims and without departing from my invention or sacrificing any of the advantages thereof.

Having thus described my invention I claim:

1. An all rubber inner tube for pneumatic tires comprising an outer vulcanized tube wall of substantially uniform thickness throughout, an inner layer of unvulcanized healing material at the outer or tread portion of the tube, and an inner vulcanized acid cure skin for the unvulcanized material.

2. The process of making a self healing air holding tube for pneumatic tires which consists in placing on a mandrel a layer of vulcanizing gum of substantially constant thickness to form a tube, placing thereon a layer of non-vulcanizing gum, applying a coating of acid cure solution to said layer of non-vulcanizing gum and permitting such coating to dry, vulcanizing the structure, turning it wrong side out lengthwise, and splicing the ends together.

In testimony that I claim the foregoing, I hereto set my hand, this 2nd day of January, 1917.

GEORGE JOSEPH REUTER.